(12) United States Patent
Alamond et al.

(10) Patent No.: US 7,845,331 B2
(45) Date of Patent: Dec. 7, 2010

(54) SEAL STRUCTURE FOR INTERNAL COMBUSTION ENGINE

(75) Inventors: Robert F. Alamond, Texarkana, TX (US); Jeffrey J. Osterchill, Texarkana, AR (US); John D. Allen, Texarkana, TX (US); Daniel T. Sparks, New Boston, TX (US)

(73) Assignee: Husqvarna Outdoor Products Inc., Augusta, GA (US)

( * ) Notice: Subject to any disclaimer, the term of this patent is extended or adjusted under 35 U.S.C. 154(b) by 505 days.

(21) Appl. No.: 11/943,686

(22) Filed: Nov. 21, 2007

(65) Prior Publication Data

US 2009/0127799 A1 May 21, 2009

(51) Int. Cl.
*F02F 1/10* (2006.01)
*F02B 75/22* (2006.01)
*F02F 7/00* (2006.01)

(52) U.S. Cl. .................................. 123/195 R; 277/591

(58) Field of Classification Search ............... 123/73 R, 123/195 R; 277/312, 313, 590–606, 634, 277/908, FOR. 248, 643; 384/119, 116, 384/282, 489, 477, 147
See application file for complete search history.

(56) References Cited

U.S. PATENT DOCUMENTS

| | | | |
|---|---|---|---|
| 5,263,444 A * | 11/1993 | Prior et al. ............... | 123/195 R |
| 5,456,229 A | 10/1995 | Emmerich | |
| 5,934,686 A | 8/1999 | Ottenschlager | |
| 6,053,142 A | 4/2000 | Achenbach et al. | |
| 6,418,903 B2 | 7/2002 | Muller et al. | |
| 7,017,917 B2 | 3/2006 | Ito et al. | |
| 7,267,092 B2 * | 9/2007 | Allmendinger ......... | 123/195 R |
| 2007/0113818 A1 * | 5/2007 | Allmendinger ......... | 123/195 R |

FOREIGN PATENT DOCUMENTS

| | | |
|---|---|---|
| JP | 63083408 U | 6/1988 |
| JP | 08303299 A | 11/1996 |
| JP | 12515611 A | 11/2000 |

OTHER PUBLICATIONS

PCT International Search Report for PCT/US2008/08291 dated Jul. 9, 2009.

* cited by examiner

*Primary Examiner*—Michael Cuff
*Assistant Examiner*—Hung Q Nguyen
(74) *Attorney, Agent, or Firm*—Pearne & Gordon LLP

(57) ABSTRACT

A seal structure is provided for an internal combustion engine. The seal structure can include a main seal link, at least one fastener seal connected to the main seal link and adapted to surround at least a portion of a crankcase fastener hole, and an enlarged bearing seal operatively connected to the fastener seal and adapted to be in sealing abutment with at least a portion of an outer race of a bearing. The engine can include a crankcase formed of a first section and a second section retained together with the seal structure located therebetween for providing a seal for the crankcase.

8 Claims, 5 Drawing Sheets

SEAL STRUCTURE FOR INTERNAL COMBUSTION ENGINE

CROSS-REFERENCE TO RELATED APPLICATIONS

Not applicable.

FIELD OF THE INVENTION

The present invention relates generally to seal structure for an internal combustion engine, and more particularly, to seal structure having a bearing seal for use in an internal combustion engine.

BACKGROUND OF THE INVENTION

Typically, outdoor power tools utilize a two-stroke or four-stroke internal combustion engine for powering an implement such as a line trimmer, blower/vacuum, chain saw, hedge trimmer, or the like. The engines are relatively light and may readily be carried by an operator during operation with various angular orientations. Internal combustion engines often have a crankcase that is split at the level of the crankshaft bearing. A first crankcase section, which can be an upper section having at least one combustion cylinder, is generally cast of light metal alloys, such as aluminum alloys, that have good thermal conductivity and a relatively low weight. A second crankcase section, which can be a lower section that is not subject to such severe thermal strains, can be made of similar light metal alloys, or even various thermoplastic materials or the like. However, various manufacturing or performance problems, such as the great temperature difference between the crankcase sections, can lead to sealing problems.

Conventionally, a seal is provided between the two crankcase sections. In one example, the seal can be formed in place from a generally liquid seal material that is provided between the crankcase sections and permitted to cure into a solid material. However, it is difficult and labor-intensive to ensure a complete and uniform seal between the crankcase sections. Further, a formed-in-place seal cannot be reused upon engine disassembly. In another example, a preformed seal can be utilized. However, generally one or both of the crankcase sections must be machined before assembly to achieve a clean sealing surface for the sealing element. Such machining is difficult, expensive, and labor-intensive

BRIEF SUMMARY OF THE INVENTION

The following presents a simplified summary of the invention in order to provide a basic understanding of some example aspects of the invention. This summary is not an extensive overview of the invention. Moreover, this summary is not intended to identify critical elements of the invention nor delineate the scope of the invention. The sole purpose of the summary is to present some concepts of the invention in simplified form as a prelude to the more detailed description that is presented later.

In accordance with one aspect of the present invention, a seal structure is provided for a crankcase of an internal combustion engine. The seal structure includes a main seal link having two ends, and a pair of fastener seals. Each of the fastener seals is connected to one end of the main seal link and has a continuous geometry adapted to surround a crankcase fastener hole. The seal structure also includes a pair of enlarged bearing seals, each being operatively connected to one of the fastener seals and including a concave, generally curved geometry adapted to sealingly abut less than one half of an outer periphery of an outer race of a bearing.

In accordance with another aspect of the present invention, a seal structure is provided for an internal combustion engine. The engine has a crankcase formed of a first section and a second section retained together by a crankcase fastener extending into a fastener hole. Each of the sections includes a mating face surface, and one of the mating face surfaces includes a seal groove. The first and second sections further define a bearing pocket therebetween, and a bearing is located within the bearing pocket and includes an outer race. A crankshaft is supported for rotation within the crankcase by the bearing, and the seal structure is located within the seal groove. The seal structure includes a main seal link, at least one fastener seal connected to the main seal link and adapted to surround the crankcase fastener hole, and an enlarged bearing seal operatively connected to the fastener seal and in sealing abutment with at least a portion of the outer race of the bearing.

In accordance with another aspect of the present invention, a crankcase for an internal combustion engine, including an upper crankcase section and a lower second crankcase section, each of the crankcase sections including a mating face surface and a crankcase fastener hole. A seal groove is formed in one of the upper and lower crankcase sections, and a bearing pocket is defined between the upper and lower crankcase sections. A bearing is located within the bearing pocket and including an outer race, and a crankshaft is supported for rotation within the crankcase by the bearing. A crankcase fastener extends into the crankcase fastener hole for attaching the upper crankcase section to the lower crankcase section to thereby maintain the mating face surfaces in face-to-face adjacency. A crankcase seal is located between the upper and lower crankcase sections and within the seal groove. The crankcase seal includes a main seal link, at least one fastener seal connected to the main seal link and adapted to surround the crankcase fastener hole, and an enlarged bearing seal operatively connected to the fastener seal. The enlarged bearing seal includes a concave, generally curved geometry adapted to sealingly abut less than half of the outer periphery of the outer race of the bearing.

BRIEF DESCRIPTION OF THE DRAWINGS

The foregoing and other aspects of the present invention will become apparent to those skilled in the art to which the present invention relates upon reading the following description with reference to the accompanying drawings, in which.

DESCRIPTION OF EXAMPLE EMBODIMENTS

Figure 1:
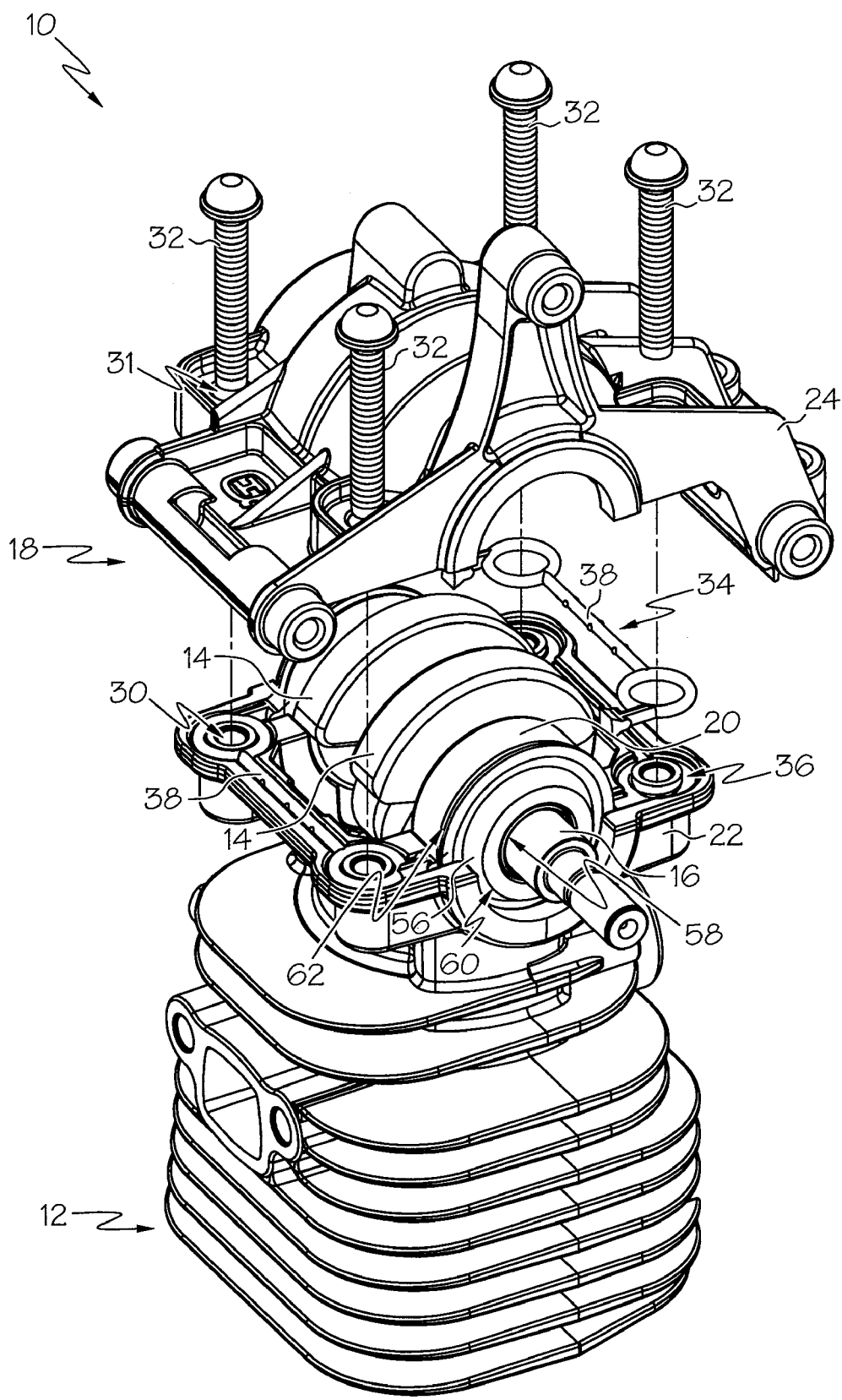
FIG. 1 is an exploded, perspective view of an example internal combustion engine with an example seal structure.

Example embodiments that incorporate one or more aspects of the present invention are described herein and illustrated in the drawings. These illustrated examples are not intended to be a limitation on the present invention. For example, one or more aspects of the present invention can be utilized in other embodiments and even other types of devices. Moreover, certain terminology is used herein for convenience only and is not to be taken as a limitation on the present invention. Still further, in the drawings, the same reference numerals are employed for designating the same elements.

Referring initially to FIG. 1, a perspective view of an example internal combustion engine 10 is illustrated in accordance with an aspect of the present invention. As shown, the example engine 10 is illustrated generally as a two-stroke engine, though it is to be appreciated that the engine can also be of a four-stroke design. The engine 10 can be employed in a handheld power tool (not shown), such as a line trimmer, blower/vacuum, chain saw, hedge trimmer, or the like. However, it is to be appreciated that the engine 10 can be utilized in various other suitable applications, including non-handheld power tools, such as lawn mowers, tractors, chippers, snow blowers, etc.

The engine 10 generally includes a combustion cylinder 12 with cooling structure (e.g., fins or the like), and a piston (not shown) longitudinally moveable therein. The piston is journalled so as to be pivotally movable via a crank pin (not shown) on a connecting rod (not shown). The crank pin is held between two crank cheeks 14, which operate to balance a mass of the crank drive (e.g., counterweights). The connecting rod extends between and is operatively coupled to the piston and a crankshaft 16 that is supported for rotation within a crankcase 18 via a pair of bearings 20. The bearings 20 can include various types of bearings, such as roller bearings, needle bearings, thrust bearings, or the like. The crankshaft 16 is operatively connected to a drive shaft (not shown), which delivers rotational force to an operational portion (e.g., a trimmer head drive shaft) of the power tool. Of course, the engine 10 can include additional combustion cylinders and related structure, and/or can even include various additional two-stroke or four-stroke engine elements.

As shown, the crankcase 18 is split at the level of the crankshaft bearings 20. A first crankcase section 22, which can be an upper section (as shown in FIG. 1, the engine 10 is oriented upside down for clarity) having the combustion cylinder 12, is generally cast of light metal alloys, such as aluminum alloys or the like, that have good thermal conductivity and a relatively low weight. A second crankcase section 24, which can be a lower section that is not subject to such severe thermal strains, can be made of similar light metal alloys, or even various thermoplastic materials or the like. Of course, either or both of the first and second crankcase sections 22, 24 can include various other suitable materials, such as various other suitable metals or the like, and can be formed using various manufacturing processes, such as casting, molding, machining, etc. Further still, where the engine 10 is a four-stroke engine using splash or oil-misting lubrication, the lower, second crankcase section 24 can include lubrication structure, such as an oil reservoir, oil dipper, or the like.

Figure 4:
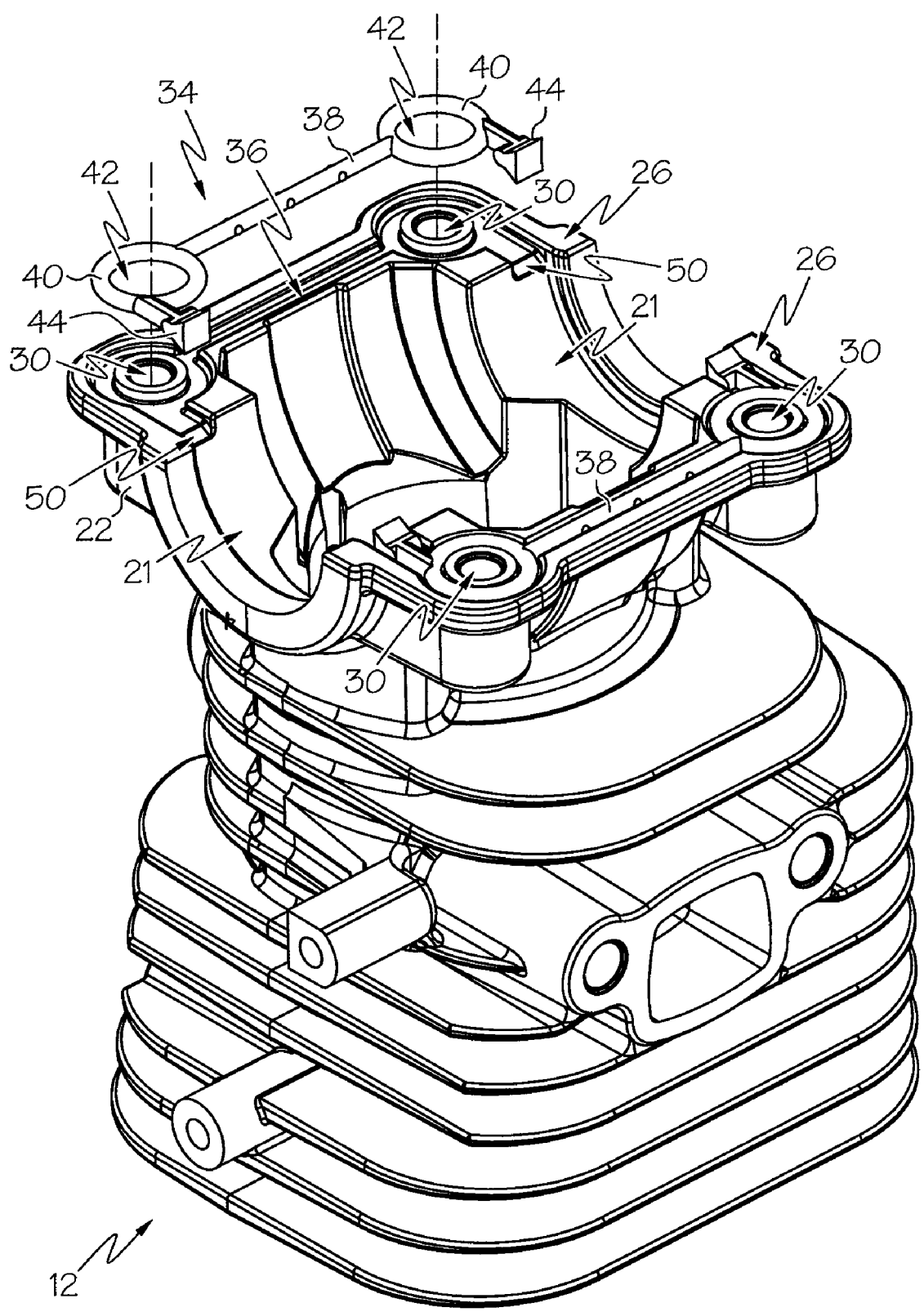
FIG. 4 is an exploded, perspective view of one section of an example crankcase illustrating an example seal groove for use with the example seal structure of FIG. 1.
Figure 5:
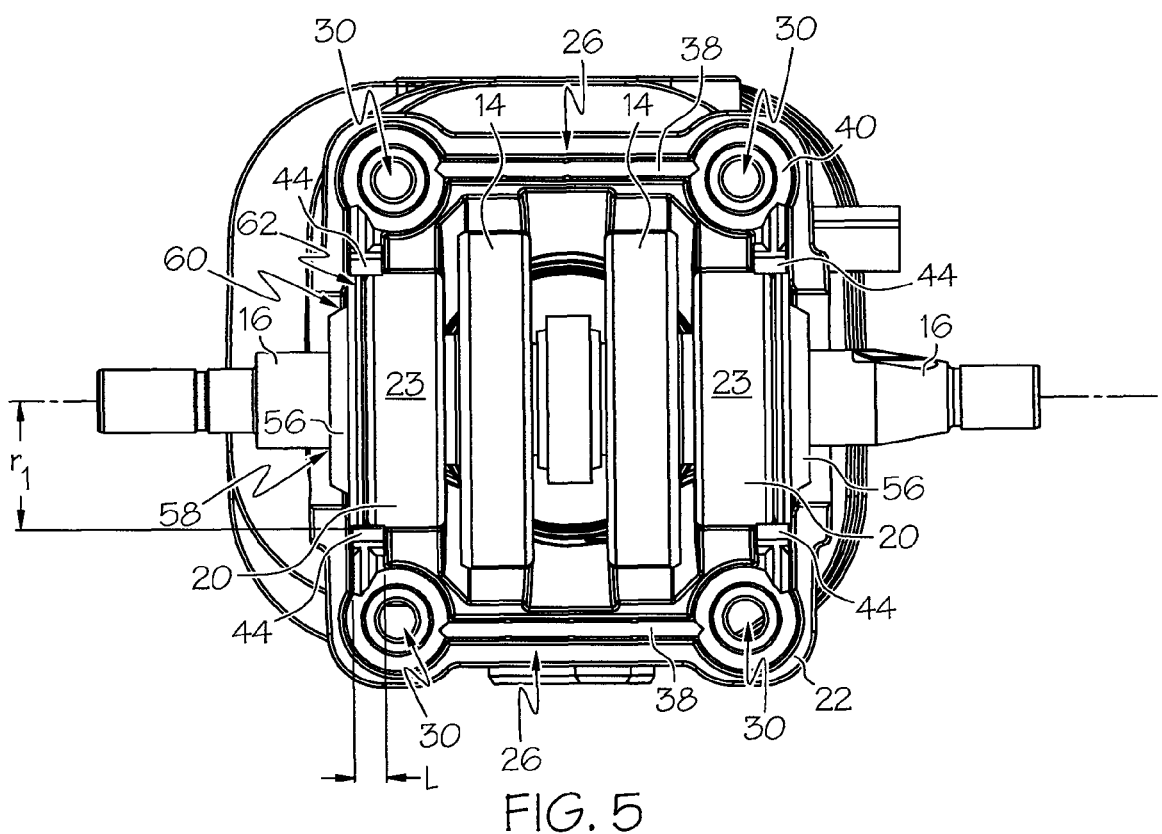
FIG. 5 is similar to FIG. 4, but shows a top view including additional example engine structure.
Figure 6:
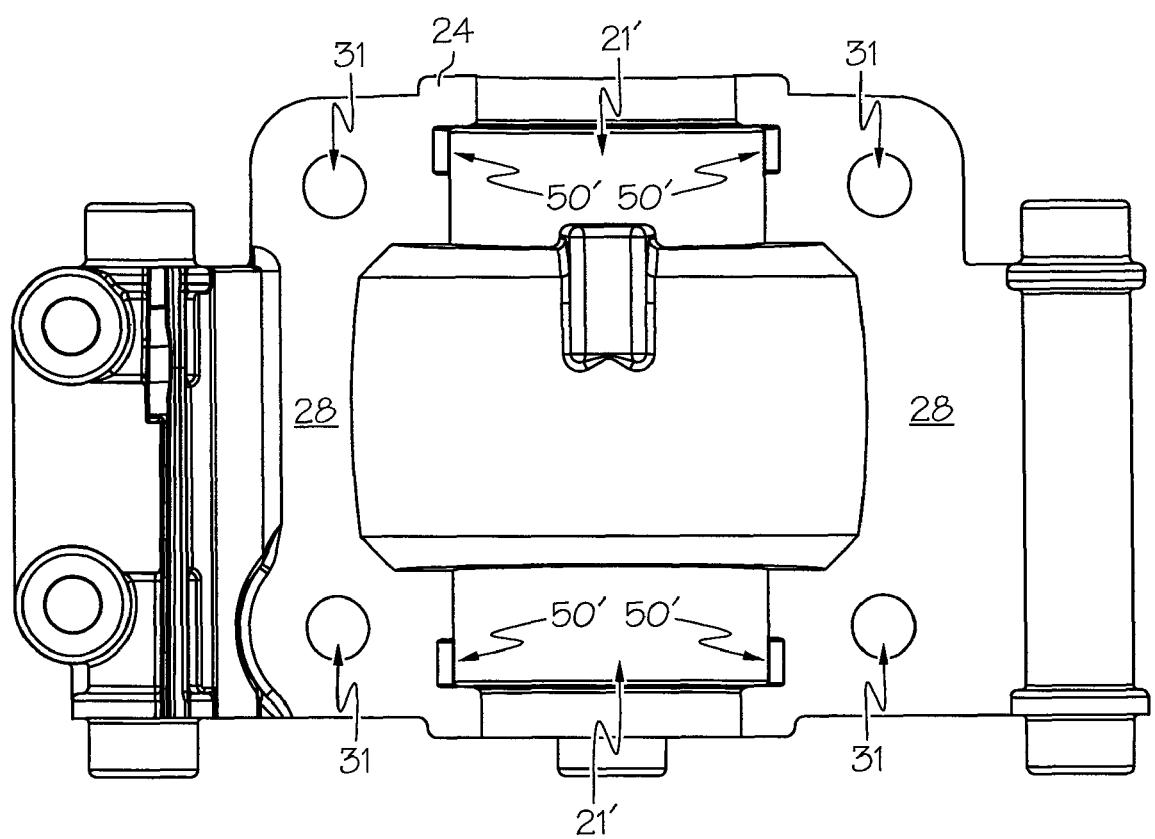
FIG. 6 is a bottom view of another section of the example crankcase of FIG. 1.

Turning briefly to FIGS. 4-6, each of the first and second crankcase sections 22, 24 can include a mating face surface 26, 28, respectively, upon which the two sections 22, 24 contact each other. Additionally, a plurality of crankcase fastener holes 30, 31 are provided through the mating face surfaces 26, 28, respectively, and are adapted to receive crankcase fasteners 32, such as various screws, bolts, or the like. In one example, any or all of the fastener holes 30, 31 can include internal threading corresponding to the crankcase fasteners 32. In addition or alternatively, any or all of the fastener holes 30, 31 can include a generally smooth bore. The crankcase fasteners 32 extend into the crankcase fastener holes 30, 31 and are adapted to attach the first and second crankcase sections 22, 24 together so as to retain the mating face surfaces 26, 28 in face-to-face adjacency.

In accordance with an aspect of the present invention, a seal can be provided between the mating face surfaces 26, 28 to inhibit material (e.g., fuel, oil, debris, etc.) from inadvertently entering, or leaking from, the crankcase 18. For example, as shown in the various Figures, a crankcase seal 34 can be located between the upper and lower crankcase sections 22, 24 to thereby seal the crankcase 18. The crankcase seal 34 can be a pre-formed, monolithic element, or can include a plurality of cooperating sealing elements. The crankcase seal 34 can be formed of various materials, such as a resilient, elastic polymer, rubber, silicone, or the like. In one example, the crankcase seal 34 can be formed of a high temperature nitrile material. In addition or alternatively, the seal 34 can be formed of a paper, fiberous, or other suitable gasket material capable of withstanding a relatively high temperature engine environment. Additionally, the seal 34 may be reusable upon disassembly of the engine 10.

To increase the effectiveness of the crankcase seal 34, a seal groove 36 can be incorporated into at least one of the first and second crankcase sections 22, 24. For example, as shown in FIGS. 4-6, the mating face surface 26 of the first crankcase section 22 can include the seal groove 36 extending generally about an outer peripheral edge thereof, and around each of the crankcase fastener holes 30. However, because the bearings 20 reside within the bearing pockets 21, 21' formed into the first and second crankcase sections 22, 24, the seal groove 36 can be split (as shown) into two seal grooves 36, each being formed on opposite sides of the bearing pockets 21, 21' and each being adapted to receive a separate crankcase seal 34. The seal groove 36 can be machined into the mating face surface 26 (e.g., milling, sawing, grinding, drilling, etc.) though it can be beneficial (e.g., to reduce manufacturing complexity) to form the seal groove 36 during the crankcase casting process without further machining procedures. Additionally, to further reduce manufacturing complexity, the mating face surface 28 of the second crankcase section 24 can include a relatively flat surface (e.g., without a seal groove) that is similarly formed by way of a casting process without further machining. Thus, when the crankcase 18 is assembled with the fasteners 32, the crankcase seal 34 will be trapped between, and in sealing engagement with, the seal groove 36 of the first crankcase section 22 and the mating face surface 28 of the second crankcase section 24. Use of a seal groove 36 in at least one of the mating face surfaces 26, 28 can allow the crankcase seal 34 to maintain a relatively low profile, which can be beneficial to permit the two crankcase sections 22, 24 to come into close or even complete contact to further inhibit entry or leakage of material from the crankcase 18. Of course, a seal groove can be formed in either, or both, of the first and second crankcase sections 22, 24.

Figure 2:
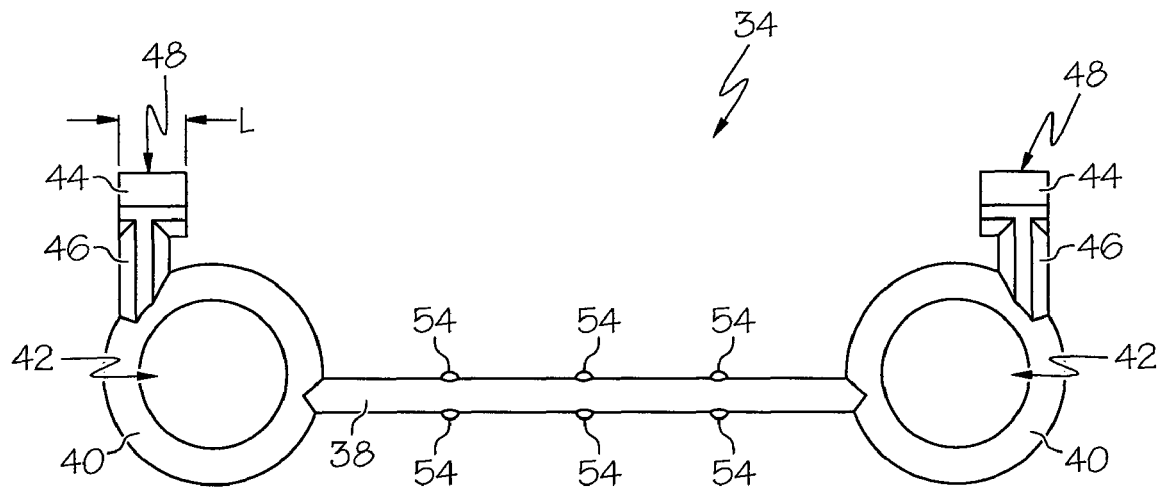
FIG. 2 is a top view of the example seal structure of FIG. 1.
Figure 3:
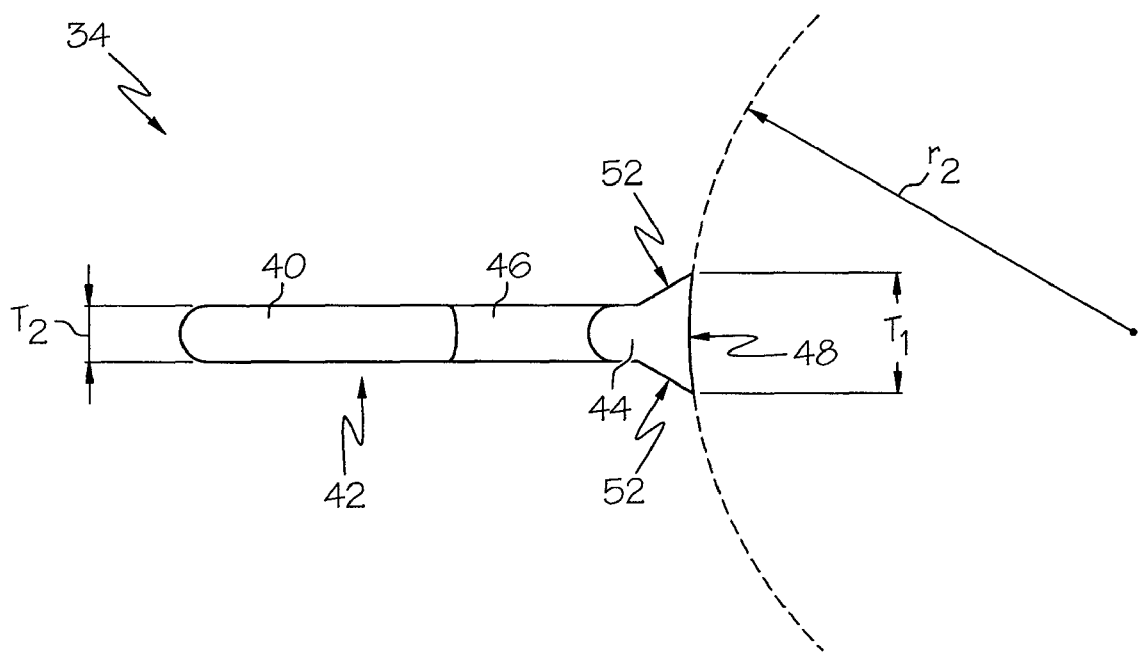
FIG. 3 is similar to FIG. 2, but shows a side view.

Turning now to FIGS. 2-3, an example crankcase seal 34 is illustrated. The seal 34 includes a main seal link 38 and at least one fastener seal 40 connected to the main seal link 38. In one example, as shown, the crankcase seal 34 can include two fastener seals 40, each being connected to an end of the main seal link 38 and positioned so as to surround a separate crankcase fastener hole 30. Thus, for example, each fastener seal 40 can have a generally continuous, circular geometry with an open central hole 42 so as to surround the fastener hole 30, which is similarly circular. Of course, as shown in FIG. 4, the seal groove 36 can have a corresponding geometry so as to accommodate the crankcase seal 34. Thus, as shown, the main seal link 38 can generally extend along and seal the side of the crankcase 18, while the two fastener seals 40 can each seal a respective corner of the crankcase 18. The two fastener seals 40 can be generally similar, though can also be different and/or have various other sizes or geometries, such as triangular, square, rectangular, elliptical, polygonal, random, etc. Further, various numbers of fastener seals 40 located variously can be used so as to accommodate various crankcase fastener 32 locations. Further still, any or all of the fastener seals 40 can extend only partially around a fastener 32, and/or can cooperate with additional crankcase structure (not shown) or an additional seal (not shown) to provide adequate sealing of the crankcase 18 about various fastener hole 30 locations.

The crankcase seal 34 can further include an enlarged bearing seal 44 operatively connected to the fastener seal 40 for sealingly engaging one or more of the crankshaft bearings 20. As shown, the enlarged bearing seal 44 can be connected to the fastener seal 40 by way of an intermediate link 46 or the like, though it can also be directly connected to, and or even formed with or as a portion of, the fastener seal 40. The enlarged bearing seal 44 can have various geometries for sealing engagement with the crankshaft bearing 20. As is conventional, the crankshaft bearings 20 can include an outer race 23 that is supported by the bearing pockets 21, 21', and is adapted to rotate relative to an inner race (not shown) attached to the crankshaft 16. As shown in FIG. 3, the enlarged bearing seal 44 can have a generally triangular geometry with a seal end face 48 arranged in a generally transverse orientation for engagement with the outer race 23 of the crankshaft bearing 20. Of course, the enlarged bearing seal 44 can have various other sizes and/or geometries.

Additionally, as shown, the enlarged bearing seal 44 can have a generally enlarged geometry relative to the remainder of the crankcase seal 34. For example, the main seal link 38 can have a nominal thickness $T_2$, while the enlarged bearing seal 44 can have a total thickness $T_1$ greater than the nominal thickness $T_2$ of the main seal link 38. As shown, the enlarged total thickness $T_1$ of the enlarged bearing seal 44 provides the seal end face 48 with increased surface area for sealing against the crankshaft bearing 20. Of course, the total thickness of the enlarged bearing seal 44 can also be approximately equal to, or even less than, the nominal thickness $T_2$ of the main seal link 38. In other examples, the enlarged bearing seal 44 can also have a generally enlarged geometry relative to the fastener seal 40 and/or even the intermediate link 46 (e.g., the total thickness $T_1$ can be greater than the nominal thickness of the fastener seal 40 and/or the intermediate link 46). Thus, the seal end face 48 can be enlarged or reduced as required to provide differing amounts of surface area so as to provide differing performance levels of sealing against the crankshaft bearings 20. In addition, various seal end faces 48 can have different geometries for sealing against different bearings of the like. Thus, though the enlarged bearing seal 44 is shown in FIG. 3 as having a generally symmetrical geometry relative to the intermediate link 46, the seal 44 can also have an unsymmetrical geometry. Further, though shown as having a generally uniform nominal thickness $T_2$, the thicknesses of the various portions of the crankcase seal 34 can vary. For example, particular portions can have a relatively thicker geometry so as to provide an increased sealing performance.

In one example, the seal end face 48 can have a size and/or geometry adapted to abut less than half of the outer periphery of the outer race 23 of the bearing 20. For example, as shown, the seal end face 48 can have a have a size and/or geometry adapted to abut approximately one twenty-fifth of the outer periphery of the outer race 23. Of course, the seal end face 48 can be adapted to abut various other amounts of the outer race 23. Even further still, the seal end face 48 can have various lengths L (see FIG. 2) so as to abut various amounts of the total length of the bearing outer race 23. For example, as shown in FIG. 5, the seal end face 48 can have a length L adapted to abut approximately one quarter of the total length of the outer race 23, though various other lengths and degrees of contact are also contemplated so as to provide various other sealing performance levels.

The seal end face 48 can also have various geometries so as to provide an increased seal against the outer race 23 of the crankshaft bearing 20. In one example, the seal end face 48 can have a generally flat geometry (not shown). However, the outer race 23 of the bearing 20 is generally circular in geometry, and as such has a generally convex geometry defined by a first radius $r_1$ measured between the centerline of the crankshaft 16 and the outer peripheral edge of the outer race 23. Thus, reduced or inadequate sealing may occur where the seal end face 48 has a generally flat geometry that abuts the generally convex geometry of the outer race 23. Still, where the seal end face 48 includes a flexible material, the seal end face 48 can be deformed to seal against the outer race 23 during assembly of the crankcase 18 to thereby increase the sealing surface area.

In another example, as shown in FIG. 3, the seal end face 48 can include a generally curved geometry having a second radius $r_2$ approximately equal to the first radius $r_1$ of the outer race 23. For example, as shown, the seal end face 48 can have a generally curved, concave geometry. As such, because the second radius $r_2$ is approximately equal to the first radius $r_1$, increased sealing with the bearing 20 can occur across substantially the entire surface area of the seal end face 48 when assembled in the crankcase 18. Additionally, where the seal end face 48 includes a flexible material, it can be deformed to seal against irregularities of the outer race 23 to thereby increase the sealing surface area.

Turning now to FIGS. 4 and 5, the crankcase 18 can include additional features to facilitate increased sealing by the crankcase seal 34. As previously described, each crankshaft bearing 20 is located within a bearing pockets 21, 21' formed into each of the first and second crankcase sections 22, 24, and the seal grooves 36 each terminate at the bearing pockets 21, 21'. Thus, the bearing pocket 21 of the first crankcase section 22 can include a chamfer pocket 50 at the interface with each seal groove 36 to accommodate the enlarged bearing seal 44. Similarly, although the second crankcase section 24 may not include a seal groove 36, the bearing pocket 21' can still include a chamfer pocket 50' corresponding to the chamfer pocket 50 of the first crankcase section 22. For example, as shown, each bearing pocket 21, 21' can include two chamfer pockets 50, 50', one on either side for accommodating an enlarged bearing seal 44 of a respective crankcase seal 34. Further, as shown, each bearing pocket 21, 21' on each of the first and second crankcase sections 22, 24 can include the chamfer pockets 50, 50'. The chamfer pockets 50, 50' can include various geometries and sizes. As shown, the chamfer pockets 50, 50' can have a relatively flat geometry formed by removing the edge or corner between the bearing pocket 21, 21' and the seal groove 36, and/or the bearing pocket 21, 21' and the mating face surface 26, 28. The chamfer pockets 50, 50' can each have a geometry adapted to generally accommodate the rear face surfaces 52 of each enlarged bearing seal 44 so as to generally inhibit movement of the enlarged bearing seal 44 relative to the outer race 23 when the first and second crankcase sections 22, 24 are assembled together. Of course, the chamfer pockets 50, 50' can have various geometries to accommodate various enlarged bearing seals 44 with various rear face surfaces 52, which may or may not be identical to each other, and including various flat, curved, patterned, and/or non-uniform/irregular geometries.

In another example feature, turning back to FIG. 3, the main seal link 38 can include a resilient protrusion 54 adapted to facilitate retention of the main seal link 38 within the seal groove 36. For example, the main seal link 38 can include a plurality of protrusions 54 each adapted to extend a distance away from the main seal link 38 so as to be compressed against the walls of the seal groove 36 when the crankcase seal 34 is inserted therein to provide an interference or press fit. Various numbers of resilient protrusions 54 having various geometries can be located variously about the main seal link 38, and/or can even be located on the fastener seal 40, enlarged bearing seal 44, and/or intermediate link 46. In the shown example, the protrusions 54 can be formed with the crankcase seal 34, though they can also be separate elements permanently or removably attached to the seal 34 in various manners. In addition or alternatively, the seal groove 36 can include protrusions, indentations, or the like for providing an interference or press fit with the crankcase seal 34. In another example, the resilient protrusions 54 may only interfere with the seal groove 36 when the crankcase seal 34 is compressed during assembly of the first and second crankcase sections 22, 24.

In yet another example feature, though not shown, the various portions of the crankcase seals 34 can be formed with a generally circular cross-sectional geometry. As such, the generally circular cross-sectional geometry can facilitate insertion, removal, retention, and/or sealing of the seals 34. Of course, any of the various portions of the seals 34 can include various other cross-sectional geometries, such as triangular, square, rectangular, elliptical, irregular, random, etc. In addition or alternatively, the various portions of the crankcase seals 34 can include various surface features, such as raised portions, flattened portions, indented portions, surface textures, etc. Of course, the geometry of the seal groove 36 can be similarly shaped so as to cooperate with the cross-sectional geometry, sizing, and/or surface features of the crankcase seal 34.

In yet another example feature, as show in FIG. 5, two crankcase seals 34 can be used to seal two sides and four corners of the crankcase 18. However, the portion of the crankcase 18 retaining the bearings 20 can otherwise remain poorly sealed. Thus, crankshaft end seals 56 can be utilized on the outboard side of each crankshaft bearing 20 to provide a seal between the crankshaft bearing 20 and the crankcase 18. For example, as shown in FIGS. 1 and 5, each crankshaft end seal 56 can include a central hub 58 that sealingly engages the crankshaft 16, and an end face 60 that sealingly engages the face of the bearing pocket 21, 21' so as to provide a seal for the remaining two sides of the crankcase 18 with the first and second crankcase sections 22, 24 are assembled. Finally, each crankshaft end seal 56 can include an outer annular peripheral edge 62 for sealingly engaging the crankshaft seal 34. In one example, the outer annular peripheral edge 62 can sealingly engage the enlarged bearing seal 44. Thus, in the shown example, two crankcase seals 34 and two crankshaft end seals 56 can provide a generally continuous seal around the perimeter of the crankcase 18. Additionally, the crankshaft end seals 56 can include various materials, such as various resilient and elastic polymers, rubbers, etc. that are a capable of withstanding relatively high temperature engine conditions.

In addition or alternatively, the crankshaft end seals 56 can have an outer radius generally equal to the outer radius $r_1$ of the outer race 23 of the bearing 20. Thus, the seal end face 48 of the enlarged bearing seal 44 can sealingly engage both of the outer race 23 and the outer annular peripheral edge 62 so as to provide a generally continuous seal around the crankcase 18 perimeter. In another example, the outer radius of the crankshaft end seals 56 can be greater than the outer radius $r_1$ of the outer race 23 so as to permit compression of the outer annular peripheral edge 62 by the bearing pockets 21, 21' upon assembly of the first and second crankcase sections 22, 24. In such a case, the outer radius of the crankshaft end seals 56 would then be approximately equal to the outer radius $r_1$ of the outer race 23 so as to facilitate sealing engagement with the enlarged bearing seal 44 and both of the bearing 20 and the crankshaft end seal 56. Of course, any or all of the bearing end seals 56 can also be formed with, be attached to, and/or a part of the bearings 20. In addition or alternatively, bearing seals can be located on the inboard side (not shown) of any or all of the bearings 20, and the enlarged bearing seal 44 can similarly sealingly engage such inboard bearing seals.

An example assembly of the engine 10 will now be described. Each of the first and second crankcase sections 22, 24 are manufactured, such as from a casting, molding, or other forming process. During the forming process, a crankcase seal groove 36 can be formed (e.g., cast) in at least one of the first and second crankcase sections 22, 24. Various post-cast machining operations can be performed, though the crankcase seal 34 and mating face surfaces 26, 28 can remain in an as-formed condition (e.g., as-cast condition) to eliminate additional manufacturing procedures. A piston subassembly can be assembled in a conventional manner with a crankshaft 16. A pair of bearings 20 can be assembled on the crankshaft 16, and a crankshaft end seal 56 can be assembled on the outboard side of each bearing 20. The crankshaft subassembly can then be assembled with the first crankcase section 22, placing the piston within the combustion chamber cylinder 12 and locating the bearings 20 and crankshaft end seals 56 within the respective bearing pockets 21, 21'.

Next, a crankcase seal 34 can be placed into each of the seal grooves 36. Each enlarged bearing seal 44 can be located within a respective chamfer pocket 50, 50' of the first crankcase section 22, and each seal end face 48 can be in abutment with either or both of the outer race 23 of the bearing and the crankshaft end seal 56. Next, the second crankcase section 24 can be assembled onto the first crankcase section 22 such that the mating face surface 28 comes into contact with the crankcase seal 34. Additionally, the enlarged bearing seal 44 can be simultaneously located in the respective chamfer pockets 50, 50' of the second crankcase section 24. Finally, the fasteners 32 are utilized (e.g., screwed, bolted, etc.) to clamp and retain the two crankcase sections 22, 24 together. Tightening of the fasteners 32 can cause the mating face surface 28 to compress the crankcase seal 34 within the seal groove 36 and against the bearings 20 and/or crankshaft end seals 44 to thereby seat the crankcase 18. Of course, more or less manufacturing steps and/or elements can be utilized in the assembly of the engine 10.

The invention has been described with reference to the example embodiments described above. Modifications and alterations will occur to others upon a reading and understanding of this specification. Examples embodiments incorporating one or more aspects of the invention are intended to include all such modifications and alterations insofar as they come within the scope of the appended claims.

What is claimed is:

1. A seal structure for an internal combustion engine, the engine having a crankcase formed of a first section and a second section retained together by a crankcase fastener extending into a fastener hole, each of the first and second sections including a mating face surface, one of the mating face surfaces including a seal groove, the first and second sections further defining a bearing pocket therebetween, a bearing being located within the bearing pocket and including an outer race, and a crankshaft being supported for rotation within the crankcase by the bearing, the seal structure being located within the seal groove and including:

a main seal link having a nominal thickness;

at least one fastener seal connected to the main seal link and adapted to surround at least a portion of the crankcase fastener hole; and an enlarged bearing seal operatively connected to the at least one fastener seal and in sealing abutment with at least a portion of the outer race of the bearing, the enlarged bearing seal having a total thickness greater than the nominal thickness of the main seal link.

2. The seal structure of claim 1, wherein the outer race of the bearing has a generally convex geometry defined by a radius, and the enlarged bearing seal includes a generally concave geometry having a radius approximately equal to the radius of the outer race.

3. The seal structure of claim 1, further including a pair of fastener seals and a pair of enlarged bearing seals, each fastener seal being connected to an opposite end of the main seal link, and each enlarged bearing seal being operatively connected to one of the fastener seals.

4. The seal structure of claim 1, wherein the main seal link includes a resilient protrusion adapted to facilitate retention of the main seal link within the seal groove.

5. The seal structure of claim 1, wherein the enlarged bearing seal is adapted to sealingly abut less than one half of an outer periphery of the outer race of the bearing.

6. The seal structure of claim 1, wherein the bearing pocket further includes a chamfer pocket for accommodating the enlarged bearing seal.

7. The seal structure of claim 1, further including an intermediate link connecting the enlarged bearing seal to the fastener seal.

8. The seal structure of claim 1, wherein the seal groove is formed by way of a casting process without the use of a machining procedure.

* * * * *